United States Patent
Tang et al.

(10) Patent No.: US 11,659,554 B2
(45) Date of Patent: May 23, 2023

(54) METHOD AND APPARATUS FOR WIRELESS COMMUNICATION

(71) Applicant: GUANGDONG OPPO MOBILE TELECOMMUNICATIONS CORP., LTD., Guangdong (CN)

(72) Inventors: Hai Tang, Dongguan (CN); Hua Xu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 117 days.

(21) Appl. No.: 17/152,542

(22) Filed: Jan. 19, 2021

(65) Prior Publication Data

US 2021/0144692 A1    May 13, 2021

Related U.S. Application Data

(63) Continuation of application No. 16/466,980, filed on Jun. 5, 2019, now Pat. No. 10,959,215, which is a
(Continued)

(51) Int. Cl.
*H04W 72/04*    (2023.01)
*H04W 16/28*    (2009.01)
(Continued)

(52) U.S. Cl.
CPC ....... *H04W 72/0406* (2013.01); *H04W 16/28* (2013.01); *H04W 36/0083* (2013.01); *H04W 72/005* (2013.01); *H04W 72/044* (2013.01)

(58) Field of Classification Search
CPC ............ H04W 16/28; H04W 36/0083; H04W 72/044; H04W 72/046
See application file for complete search history.

(56) References Cited

U.S. PATENT DOCUMENTS 8,036,669 B2    10/2011 Dong
8,265,646 B2    9/2012 Agarwal
(Continued)

FOREIGN PATENT DOCUMENTS

CA      2648568 A1    11/2007
CN    101427595 A     5/2009
(Continued)

OTHER PUBLICATIONS

First Office Action of the Taiwanese application No. 106141979, dated Jul. 16, 2021.
(Continued)

*Primary Examiner* — Raj Jain
(74) *Attorney, Agent, or Firm* — Ladas & Parry, LLP

(57) ABSTRACT

Embodiments of the present invention provide a method and apparatus for wireless communication, for use in a communication system at least using two beams. The method comprises: a network device determines transmission resources that can be used by M beam groups, wherein each beam group comprises at least one beam in the at least two beams, M≥1; the network device sends configuration information to a first terminal device, the configuration information being used for indicating the transmission source used by each beam group, so that the practicability and user experience of a multi-beam system can be improved.

28 Claims, 4 Drawing Sheets

Related U.S. Application Data continuation of application No. PCT/CN2016/109081, filed on Dec. 8, 2016.

(51) Int. Cl.
*H04W 72/00* (2023.01)
*H04W 36/00* (2009.01)
*H04W 72/044* (2023.01)

(56) References Cited

U.S. PATENT DOCUMENTS

| | | | |
|---|---|---|---|
| 8,274,930 | B2 | 9/2012 | Orlik |
| 8,331,878 | B2 | 12/2012 | Baker |
| 9,042,323 | B1 | 5/2015 | Marupaduga et al. |
| 9,137,676 | B2 | 9/2015 | Nilsson |
| 9,204,445 | B2 | 12/2015 | Chayat |
| 10,959,215 | B2 * | 3/2021 | Tang ................ H04W 72/0406 |
| 2007/0249402 | A1 | 10/2007 | Dong |
| 2009/0225883 | A1 | 9/2009 | Orlik |
| 2010/0035565 | A1 | 2/2010 | Baker |
| 2010/0075687 | A1 | 3/2010 | Chayat |
| 2010/0120418 | A1 | 5/2010 | Agarwal |
| 2012/0020316 | A1 | 1/2012 | Dong |
| 2013/0272220 | A1 | 10/2013 | Li et al. |
| 2014/0073340 | A1 | 3/2014 | Nilsson |
| 2015/0373627 | A1 | 12/2015 | Ryu et al. |
| 2016/0095003 | A1 | 3/2016 | Yu et al. |
| 2016/0150435 | A1 * | 5/2016 | Baek .................... H04B 7/0608 370/252 |
| 2016/0219570 | A1 | 7/2016 | Guo et al. |
| 2017/0265184 | A1 | 9/2017 | Liu et al. |
| 2017/0366992 | A1 * | 12/2017 | Rune .................... H04B 7/0617 |
| 2020/0092873 | A1 * | 3/2020 | Tang ................... H04W 72/005 |
| 2021/0144692 | A1 * | 5/2021 | Tang ................... H04W 72/046 |

FOREIGN PATENT DOCUMENTS

| | | |
|---|---|---|
| CN | 101523756 A | 9/2009 |
| CN | 101714886 A | 5/2010 |
| CN | 101854638 A | 10/2010 |
| CN | 103503502 A | 1/2014 |
| CN | 104025469 A | 9/2014 |
| CN | 105356981 A | 2/2016 |
| CN | 105453629 A | 3/2016 |
| CN | 105490719 A | 4/2016 |
| CN | 105790886 A | 7/2016 |
| CN | 105850224 A | 8/2016 |
| CN | 108024365 A | 5/2018 |
| CN | 109565390 A | 4/2019 |
| CN | 110115008 A | 8/2019 |
| EP | 3461200 A1 | 3/2019 |
| EP | 3490316 A1 | 5/2019 |
| EP | 3534636 A1 | 9/2019 |
| JP | 2009159214 A | 7/2009 |
| JP | 2012151876 A | 8/2012 |
| RU | 2527749 C2 | 9/2014 |
| WO | 2014182143 A1 | 11/2014 |
| WO | 2016041358 A1 | 3/2016 |
| WO | 2016163843 A1 | 10/2016 |

OTHER PUBLICATIONS

Office Action of the Australian application No. 2016431911, dated Aug. 30, 2021.
Second Office Action of the Canadian application No. 3046135, dated Apr. 30, 2021.
Third Office Action of the European application No. 16923271.7, dated May 11, 2021.
First Office Action of the Indonesian application No. P00201905744, dated Jun. 3, 2021.
International Search Report in the international application No. PCT/CN2016/109081, dated Aug. 21, 2017.
English translation of the Written Opinion of the International Search Authority in the international application No. PCT/CN2016/109061, dated Aug. 21, 2017.
ZTE ZTE Microelectronics: "Beam management for Control Channel", 3GPP Draft; R1-1611421 Beam Management for Control Channel, 3rd Generation Partnership Project (3GPP), Mobile Competence Centre ; 650, Route Des Lucioles ; F-06921 Sophia-Antipolis Cedex ; France, vol. RAN WG1, No. Reno, USA; Nov. 14, 2016-Nov. 18, 2016 Nov. 13, 2016 (Nov. 13, 2016), XP051175401, Retrieved from the Internet: URL:http://www.3gpp.org/ftp/Meetings_3GPP_SYNC/RAN1/Docs/ * the whole document *.
ASTRI TCL Communication Ltd: "Efficient design of SS block", 3GPP Draft; R1-1612289 Efficient Design of SS Block, 3rd Generation Partnership Project (3GPP), Mobile Competence Centre ; 650, Route Des Lucioles ; F-06921 Sophia-Antipolis Cedex ; France, vol. RAN WG1, No. Reno, USA; Nov. 14, 2016-Nov. 18, 2016 Nov. 13, 2016 (Nov. 13, 2016), XP051176238, Retrieved from the Internet. URL:http://www.3gpp.org/ftp/Meetings_3GPP_SYNC/RAN1/Docs/ [retrieved on Nov. 13, 2016] * the whole document *.
Supplementary European Search Report in the European application No. 16923271.7, dated Sep. 27, 2019.
Huawei et al. "Discussion on beam management aspects for DL MIMO"; 3GPP TSG RAN WG1 Meeting #87 R1-1611670; Nov. 18, 2016, entire document.
First Office Action of the Chilean application No. 201901532, dated Feb. 19, 2020.
First Office Action of the Chinese application No. 201680091474.9, dated Apr. 1, 2020.
First Office Action of the Russian application No. 2019121151, dated May 21, 2020.
First Office Action of the Canadian application No. 3048135, dated Jun. 29, 2020.
Written Opinion of the Singaporean application No. 11201905140T, dated May 26, 2020.
First Office Action of the European application No. 16923271.7, dated Jun. 18, 2020.
Second Office Action of the Chilean application No. 201901532, dated Jun. 17, 2020.
Second Office Action of the Chinese application No. 201680091474.9, dated Jun. 16, 2020.
"On beam management procedures";3GPP TSG RAN WG1 Meeting #86bis R1-1608773 Lisbon, Portugal Oct. 10-14, 2016, entire document.
"Overview on beam management"; 3GPP TSG RAN WG1 #86-bis R1-1609080 Lisbon, Portugal Oct. 10-14, 2016, entire document.
First Office Action of the Indian application No. 201917024827, dated Nov. 12, 2020.
First Office Action of the Brazilian application No. BR1120190113053, dated Sep. 15, 2020.
Second Office Action of the European application No. 16923271.7, dated Nov. 5, 2020.
Third Office Action of the Chinese application No. 201680091474.9, dated Sep. 7, 2020.
Notice of Allowance of the Russian application No. 2019121151, dated Sep. 15, 2020.
First Office Action of the Japanese application No. 2013-530487, dated Dec. 18, 2020.
Notice of Allowance of the Chinese application No. 201680091474.9, dated Dec. 15, 2020.
First Office Action of the Israeli application No. 267100, dated Dec. 29, 2020.
First Office Action of the American U.S. Appl. No. 16/466,980, dated Jun. 29, 2020.
Notice of Allowance of the American U.S. Appl. No. 16/466,980, dated Oct. 14, 2020.
First Office Action of the Mexican application No. MX/a/2019/006619, dated Jun. 23, 2022.
ZTE, ZTE Microelectronics, "NR Downlink DCI Design and Procedure," 3GPP TSG RAN WG1 Meeting #87 R1-1611293, Reno, USA Nov. 14-18, 2016, all pages.
Guangdong OPPO Mobile Telecom, "Downlink control channel design consideration" 3GPP TSG RAN WG1 Meeting #87 R1-1611704, Reno, USA, Nov. 14-18, 2016, all pages.

(56) References Cited

OTHER PUBLICATIONS

InterDigital Communications, "DL control channel framework for NR," 3GPP TSG-RAN WG1 #86bis R1-1610089 Lisbon, Portugal, Oct. 10-14, 2016, all pages.

Ericsson, "Summary of offline discussion on DL Control Channels," R1-1613311, Nov. 13, 2016, all pages.

Nokia, Alcatel-Lucent Shanghai Bell, "Beam Management—DCI monitoring," 3GPP TSG-RAN WG1#87 R1-1612863 Reno, U.S.A., Nov. 14-18, 2016, all pages.

Intel Corporation, "Beamforming for NR PDCCH," 3GPP TSG-RAN WG1 #86 R1-166561, Gothenburg, Sweden Aug. 22-26, 2016, all pages.

Ericsson, "Summary of e-mail discussions on downlink control signaling," TSG-RAN WG1 #87 R1-1612908, Reno, NV, USA, Nov. 14-18, 2016, all pages.

Intel Corporation, "NR downlink control channel and DMRS design, "3GPP TSG-RAN WG1 #87 R1-1611991 Reno, USA Nov. 14-18, 2016, all pages.

Nokia, Alcatel-Lucent Shanghai Bell, "Beam management—DCI monitoring," 3GPP TSG-RAN WG1 #86 Bis R1-1610240, Lisbon, Portugal, Oct. 10-14, 2016, all pages.

First Office Action of the Chinese application No. 202110226990.0, dated Jul. 15, 2022 and English translation provided by Global Dossier.

First Office Action of the Vietnamese application No. 1-2019-03567, dated Oct. 31, 2022.

Third Office Action of the Chinese application No. 202110226990.0, dated Jan. 19, 2023 with machine translation by Global Dossier.

* cited by examiner

METHOD AND APPARATUS FOR WIRELESS COMMUNICATION

CROSS-REFERENCE TO RELATED APPLICATION

The application is a continuation application of U.S. patent application Ser. No. 16/466,980 filed on Jun. 5, 2019, which is a US national phase of PCT Application No. PCT/CN2016/109081 filed on Dec. 8, 2016. The disclosures of both applications are incorporated by reference herein in their entireties

TECHNICAL FIELD

Embodiments of the disclosure relate to the field of communications, and more particularly to a method and device for wireless communication.

BACKGROUND

At present, there is a multi-beam system that a network device provides multiple beams and thus may provide different coverage through different beams.

In the related art, transmission resources (for example, frequency-domain resources or time-domain resources) available for different beams are fixed. That is, a communication system may specify a transmission resource available for a certain beam and, moreover, during operation of the communication system, the beam may only use the transmission resource specified by the communication system.

With development of communication technologies, communication services also have made increasingly diversified requirements on transmission resources. The same service may have different requirements on transmission resources during different time periods. Since a transmission resource available for a beam cannot be changed, there may exist the condition that the existing multi-beam system cannot meet a service requirement of a terminal device, which seriously affects practicability and user experience of the multi-beam system.

SUMMARY

The embodiments of the disclosure provide a method and device for wireless communication, which may improve practicability and user experience of a multi-beam system.

In a first aspect, there is provided a method for wireless communication, which may be performed in a communication system using at least two beams and may include the following operations.

A network device determines transmission resources available for M beam groups, here, each beam group includes at least one beam of the at least two beams and M≥1; and the network device sends configuration information to a first terminal device, here, the configuration information is used to indicate the transmission resource available for each beam group.

The network device determines transmission resources available for one or more beams and indicates the transmission resources available for the one or more beams to the terminal device through the configuration information, so that the network device may be supported to change the transmission resources available for the beams according to a requirement, different service requirements may be met and practicability and user experience of the multi-beam system are improved.

In combination with the first aspect, in a first implementation mode of the first aspect, transmission resources available for any two beam groups are different.

In combination with the first aspect and the abovementioned implementation mode thereof, in a second implementation mode of the first aspect, the operation that the network device determines the transmission resources available for the M beam groups includes the following operations.

The network device determines the transmission resource available for a beam group i according to information related to the beam in the beam group i, here, i ∈[1, M] and the information related to the beam in the beam group i corresponds to a service requirement of a service transmitted through the beam in the beam group i.

The network device determines a transmission resource available for a certain beam according to information related to the beam, so that the transmission resource available for the beam may meet a service requirement (or a requirement on transmission resources) of a service carried on the beam, and the practicability and user experience of the multi-beam system may further be improved.

In combination with the first aspect and the abovementioned implementation modes thereof, in a third implementation mode of the first aspect, the information related to the beam in the beam group i includes at least one of: a total number of terminal devices within coverage of the beam in the beam group i, a service type of the service transmitted through the beam in the beam group i, or a volume of the service transmitted through the beam in the beam group i, i ∈[1, M].

In combination with the first aspect and the abovementioned implementation modes thereof, in a fourth implementation mode of the first aspect, the operation that the network device determines the transmission resource available for the beam group i according to the information related to the beam in the beam group i includes that: responsive to it is determined that the information related to the beam in the beam group i meets a preset condition, the network device determines the transmission resource available for the beam group i according to the information related to the beam in the beam group i, i ∈[1, M].

The network device, responsive to it is determined that the information related to the beam meets the preset condition, allocates the transmission resource available for the beam, so that the transmission resource available for the beam may be timely regulated when the service requirement of the service carried on the beam changes, and the practicability and user experience of the multi-beam system may further be improved.

In combination with the first aspect and the abovementioned implementation modes thereof, in a fifth implementation mode of the first aspect, the operation that the network device determines the transmission resources available for the M beam groups includes that: the network device periodically determines the transmission resource available for the beam group i, ∈[1, M].

In combination with the first aspect and the abovementioned implementation modes thereof, in a sixth implementation mode of the first aspect, the operation that the network device sends the configuration information to the first terminal device may include that: the network device sends the configuration information to the first terminal device through dedicated signaling for the first terminal device; or the network device sends the configuration information to multiple terminal devices including the first terminal device through a Physical Broadcast Channel (PBCH) or a system broadcast message.

In combination with the first aspect and the abovementioned implementation modes thereof, in a seventh implementation mode of the first aspect, the configuration information may specifically be used to indicate one-to-one mapping relationships between the M beam groups and M transmission resources.

In combination with the first aspect and the abovementioned implementation modes thereof, in an eighth implementation mode of the first aspect, the operation that the network device sends the configuration information to the first terminal device may include the following operations.

The network device sends first configuration information to the first terminal device, here, the first configuration information is used to indicate configurations of Q transmission resources and one-to-one mapping relationships between the Q transmission resources and Q first identifiers (IDs), wherein Q≥M and the Q transmission resources include the transmission resources available for the M beam groups; and the network device sends second configuration information to the first terminal device, here, the second configuration information includes the first ID corresponding to the transmission resource available for each of the M beam groups.

The network device transmits configurations of multiple transmission resources in advance, and when the transmission resource available for a certain beam is required to be changed, the network device may only transmit an ID corresponding to the changed transmission resource, so that a signaling overhead and delay when the transmission resource available for the beam is changed may be reduced.

In combination with the first aspect and the abovementioned implementation modes thereof, in a ninth implementation mode of the first aspect, the operation that the network device sends the first configuration information to the first terminal device may include that: the network device sends the first configuration information to the first terminal device through Radio Resource Control (RRC) signaling; and the operation that the network device sends the second configuration information to the first terminal device may include that: the network device sends the second configuration information to the first terminal device through a Media Access Control (MAC) Control Element (CE) or Downlink Control Information (DCI).

In combination with the first aspect and the abovementioned implementation modes thereof, in a tenth implementation mode of the first aspect, the operation that the network device sends the first configuration information to the first terminal device may include that: the network device sends the first configuration information to the first terminal device through a MAC CE; and the operation that the network device sends the second configuration information to the first terminal device may include that: the network device sends the second configuration information to the first terminal device through DCI.

In combination with the first aspect and the abovementioned implementation modes thereof, in an eleventh implementation mode of the first aspect, the operation that the network device sends the configuration information to the first terminal device may include the following operations.

The network device sends third configuration information to the first terminal device, here, the third configuration information is used to indicate a configuration of a transmission resource in each of H transmission resource sets and one-to-one mapping relationships between H beam groups including the M beam groups and the H transmission resource sets, wherein each of the H beam groups includes at least one beam, each transmission resource set includes at least one transmission resource, H≥M and the H transmission resource sets include the transmission resources available for the M beam groups; and the network device sends fourth configuration information to the first terminal device, here, the fourth configuration information includes an identifier (ID) of each of the M beam groups, and the fourth configuration information is used to indicate an index of the transmission resource available for the beam group i in the transmission resource set corresponding to the beam group i, i ∈[1, M].

The network device notifies mapping relationships between multiple transmission resource sets and multiple beam groups to the terminal device in advance, moreover, when a transmission resource available for a certain beam is required to be changed, the network device may only transmit an ID and index of the changed beam, and then the terminal device may determine the transmission resource set corresponding to the beam and determine a transmission resource available for the beam from the determined transmission resource set, so that the signaling overhead and delay when the transmission resource available for the beam is changed may be reduced, and personalized requirements of different beams on use of transmission resources may be met.

In combination with the first aspect and the abovementioned implementation modes thereof, in a twelfth implementation mode of the first aspect, the operation that the network device sends the third configuration information to the first terminal device may include that: the network device sends the third configuration information to the first terminal device through RRC signaling; and the operation that the network device sends the fourth configuration information to the first terminal device may include that: the network device sends the fourth configuration information to the first terminal device through a MAC CE or DCI.

In combination with the first aspect and the abovementioned implementation modes thereof, in a thirteenth implementation mode of the first aspect, the operation that the network device sends the third configuration information to the first terminal device may include that: the network device sends the third configuration information to the first terminal device through a MAC CE; and the operation that the network device sends the fourth configuration information to the first terminal device may include that: the network device sends the fourth configuration information to the first terminal device through DCI.

In combination with the first aspect and the abovementioned implementation modes thereof, in a fourteenth implementation mode of the first aspect, the transmission resource may include a time-domain transmission resource.

In combination with the first aspect and the abovementioned implementation modes thereof, in a fifteenth implementation mode of the first aspect, a time-domain resource available for the communication system where the network device is located may be divided into at least two time units in a time domain, and the configuration information may specifically be used to indicate a position of a time unit in the transmission resource available for each beam group in the at least two time units.

In combination with the first aspect and the abovementioned implementation modes thereof, in a sixteenth implementation mode of the first aspect, the configuration information may be specifically an ID used to indicate whether each of the at least two time units is the transmission resource available for the beam group i, i ∈[1, M].

In combination with the first aspect and the abovementioned implementation modes thereof, in a seventeenth implementation mode of the first aspect, the transmission resource may include a frequency-domain transmission resource.

In combination with the first aspect and the abovementioned implementation modes thereof, in an eighteenth implementation mode of the first aspect, a frequency-domain resource available for the communication system where the network device is located may be divided into at least two frequency-domain units, and the configuration information may specifically be used to indicate a position of a frequency-domain unit in the transmission resource available for each beam group in the at least two frequency-domain units.

In combination with the first aspect and the abovementioned implementation modes thereof, in a nineteenth implementation mode of the first aspect, the configuration information may be specifically an ID used to indicate whether each of the at least two frequency-domain units is the transmission resource available for the beam group i, i ∈[1, M].

In combination with the first aspect and the abovementioned implementation modes thereof, in a twentieth implementation mode of the first aspect, the transmission resource available for each beam group may include no transmission resource reserved by the communication system, and the transmission resource reserved by the communication system may only be used to transmit a specified service or a specified channel.

In combination with the first aspect and the abovementioned implementation modes thereof, in a twenty-first implementation mode of the first aspect, the transmission resource reserved by the communication system includes a resource used to carry a synchronization channel or the PBCH.

In combination with the first aspect and the abovementioned implementation modes thereof, in a twenty-second implementation mode of the first aspect, the transmission resources available for a first beam and second beam in the M beam groups may be partially overlapped or completely overlapped.

In combination with the first aspect and the abovementioned implementation modes thereof, in a twenty-third implementation mode of the first aspect, the transmission resource available for a first beam group of the M beam groups may include at least one of: a first transmission resource for a control channel carrying the first beam group or a second transmission resource for a data channel carrying the first beam group.

In combination with the first aspect and the abovementioned implementation modes thereof, in a twenty-fourth implementation mode of the first aspect, the operation that the network device determines the transmission resources available for the M beam groups may include that: the network device determines a transmission resource available for each of the M beam groups during a first time period, and the network device determines a transmission resource available for each of the M beam groups during a second time period; and the operation that the network device sends the configuration information to the first terminal device may include that: the network device sends fifth configuration information to the first terminal device before the first time period, here, the fifth configuration information is used to indicate the transmission resource available for each of the M beam groups during the first time period; and the network device sends sixth configuration information to the first terminal device before the second time period, here, the sixth configuration information is used to indicate the transmission resource available for each of the M beam groups during the second time period and the second time period is different from the first time period.

In a second aspect, there is provided a method for wireless communication, which may be performed in a communication system using at least two beams and may include the following operations.

A first terminal device receives configuration information sent by a network device, here, the configuration information is used to indicate a transmission resource available for each of M beam groups, each beam group includes at least one beam of the at least two beams and M≥1; and the first terminal device determines the transmission resource available for each of the M beam groups according to the configuration information.

In combination with the second aspect, in a first implementation mode of the second aspect, transmission resources available for any two beam groups are different.

In combination with the second aspect and the abovementioned implementation mode thereof, in a second implementation mode of the second aspect, the transmission resource available for a beam group i is determined according to information related to the beam in the beam group i, here, i E ∈[1, M] and the information related to the beam in the beam group i corresponds to a service requirement of a service transmitted through the beam in the beam group i.

The network device determines a transmission resource available for a certain beam according to information related to the beam, so that the transmission resource available for the beam may meet a service requirement (or a requirement on transmission resources) of a service carried on the beam, and the practicability and user experience of the multi-beam system may further be improved.

In combination with the second aspect and the abovementioned implementation modes thereof, in a third implementation mode of the second aspect, the information related to the beam in the beam group i includes at least one of: a total number of terminal devices within coverage of the beam in the beam group i, a service type of the service transmitted through the beam in the beam group i, or a volume of the service transmitted through the beam in the beam group i, i ∈[1, M].

In combination with the second aspect and the abovementioned implementation modes thereof, in a fourth implementation mode of the second aspect, the transmission resource available for the beam group i is determined, after the information related to the beam in the beam group i meets a preset condition, according to the information related to the beam in the beam group i, i ∈[1, M].

The network device, responsive to it is determined that the information related to the beam meets the preset condition, allocates the transmission resource available for the beam, so that the transmission resource available for the beam may be timely regulated when the service requirement of the service carried on the beam changes, and the practicability and user experience of the multi-beam system may further be improved.

In combination with the second aspect and the abovementioned implementation modes thereof, in a fifth implementation mode of the second aspect, the transmission resource available for the beam group i is periodically determined, i ∈[1, M].

In combination with the second aspect and the above-mentioned implementation modes thereof, in a sixth implementation mode of the second aspect, the operation that the first terminal device receives the configuration information sent by the network device may include that: the first terminal device receives the configuration information sent by the network device through dedicated signaling for the first terminal device; or the first terminal device receives the configuration information sent to multiple terminal devices including the first terminal device by the network device through a PBCH or a system broadcast message.

In combination with the second aspect and the above-mentioned implementation modes thereof, in a seventh implementation mode of the second aspect, the configuration information may specifically be used to indicate one-to-one mapping relationships between the M beam groups and M transmission resources.

In combination with the second aspect and the above-mentioned implementation modes thereof, in an eighth implementation mode of the second aspect, the operation that the first terminal device receives the configuration information sent by the network device may include the following operations.

The first terminal device receives first configuration information sent by the network device, here, the first configuration information is used to indicate configurations of Q transmission resources and one-to-one mapping relationships between the Q transmission resources and Q first identifiers (IDs), wherein Q≥M and the Q transmission resources include transmission resources available for the M beam groups; and the first terminal device receives second configuration information sent by the network device, here, the second configuration information includes the first ID corresponding to the transmission resource available for each of the M beam groups.

The network device transmits configurations of multiple transmission resources in advance, and when the transmission resource available for a certain beam is required to be changed, the network device may only transmit an ID corresponding to the changed transmission resource, so that a signaling overhead and delay when the transmission resource available for the beam is changed may be reduced.

In combination with the second aspect and the above-mentioned implementation modes thereof, in a ninth implementation mode of the second aspect, the operation that the first terminal device receives the first configuration information sent by the network device may include that: the first terminal device receives the first configuration information sent by the network device through RRC signaling; and the operation that the first terminal device receives the second configuration information sent by the network device may include that: the first terminal device receives the second configuration information sent by the network device through a MAC CE or DCI.

In combination with the second aspect and the above-mentioned implementation modes thereof, in a tenth implementation mode of the second aspect, the operation that the first terminal device receives the first configuration information sent by the network device may include that: the first terminal device receives the first configuration information sent by the network device through a MAC CE; and the operation that the first terminal device receives the second configuration information sent by the network device may include that: the first terminal device receives the second configuration information sent by the network device through DCI.

In combination with the second aspect and the above-mentioned implementation modes thereof, in an eleventh implementation mode of the second aspect, the operation that the first terminal device receives the configuration information sent by the network device may include the following operations.

The first terminal device receives third configuration information sent by the network device, here, the third configuration information is used to indicate a configuration of a transmission resource in each of H transmission resource sets and one-to-one mapping relationships between H beam groups including the M beam groups and the H transmission resource sets, wherein each of the H beam groups includes at least one beam, each transmission resource set includes at least one transmission resource, H≥M and the H transmission resource sets include the transmission resources available for the M beam groups; and the first terminal device receives fourth configuration information sent by the network device, here, the fourth configuration information includes an identifier of each of the M beam groups, the fourth configuration information is used to indicate an index of the transmission resource available for the beam group i in the transmission resource set corresponding to the beam group i and i ∈[1, M].

The network device notifies mapping relationships between multiple transmission resource sets and multiple beam groups to the terminal device in advance, moreover, when a transmission resource available for a certain beam is required to be changed, the network device may only transmit an ID and index of the changed beam, and then the terminal device may determine the transmission resource set corresponding to the beam and determine a transmission resource available for the beam from the determined transmission resource set, so that the signaling overhead and delay when the transmission resource available for the beam is changed may be reduced, and personalized requirements of different beams on use of transmission resources may be met.

In combination with the second aspect and the above-mentioned implementation modes thereof, in a twelfth implementation mode of the second aspect, the operation that the first terminal device receives the third configuration information sent by the network device may include that: the first terminal device receives the third configuration information sent by the network device through RRC signaling; and the operation that the first terminal device receives the fourth configuration information sent by the network device may include that: the first terminal device receives the fourth configuration information sent by the network device through a MAC CE or DCI.

In combination with the second aspect and the above-mentioned implementation modes thereof, in a thirteenth implementation mode of the second aspect, the operation that the first terminal device receives the third configuration information sent by the network device may include that: the first terminal device receives the third configuration information sent by the network device through a MAC CE; and the operation that the first terminal device receives the fourth configuration information sent by the network device may include that: the first terminal device receives the fourth configuration information sent by the network device through DCI.

In combination with the second aspect and the above-mentioned implementation modes thereof, in a fourteenth implementation mode of the second aspect, the transmission resource may include a time-domain transmission resource.

In combination with the second aspect and the above-mentioned implementation modes thereof, in a fifteenth implementation mode of the second aspect, a time-domain resource available for the communication system where the network device is located may be divided into at least two time units in a time domain, and the configuration information may specifically be used to indicate a position of a time unit in the transmission resource available for each beam group in the at least two time units.

In combination with the second aspect and the above-mentioned implementation modes thereof, in a sixteenth implementation mode of the second aspect, the configuration information may be specifically an ID used to indicate whether each of the at least two time units is the transmission resource available for the beam group i, i $\in[1, M]$.

In combination with the second aspect and the above-mentioned implementation modes thereof, in a seventeenth implementation mode of the second aspect, the transmission resource may include a frequency-domain transmission resource.

In combination with the second aspect and the above-mentioned implementation modes thereof, in an eighteenth implementation mode of the second aspect, a frequency-domain resource available for the communication system where the network device is located may be divided into at least two frequency-domain units, and the configuration information may specifically be used to indicate a position of a frequency-domain unit in the transmission resource available for each beam group in the at least two frequency-domain units.

In combination with the second aspect and the above-mentioned implementation modes thereof, in a nineteenth implementation mode of the second aspect, the configuration information may be specifically an ID used to indicate whether each of the at least two frequency-domain units is the transmission resource available for the beam group i, i $\in[1, M]$.

In combination with the second aspect and the above-mentioned implementation modes thereof, in a twentieth implementation mode of the second aspect, the transmission resource available for each beam group may include no transmission resource reserved by the communication system, and the transmission resource reserved by the communication system may only be used to transmit a specified service or a specified channel.

In combination with the second aspect and the above-mentioned implementation modes thereof, in a twenty-first implementation mode of the second aspect, the transmission resource reserved by the communication system includes a resource used to carry a synchronization channel or the PBCH.

In combination with the second aspect and the above-mentioned implementation modes thereof, in a twenty-second implementation mode of the second aspect, the transmission resources available for a first beam and second beam in the M beam groups may be partially overlapped or completely overlapped.

In combination with the second aspect and the above-mentioned implementation modes thereof, in a twenty-third implementation mode of the second aspect, the transmission resource available for a first beam group of the M beam groups may include at least one of: a first transmission resource for a control channel carrying the first beam group or a second transmission resource for a data channel carrying the first beam group.

In combination with the second aspect and the above-mentioned implementation modes thereof, in a twenty-fourth implementation mode of the second aspect, the operation that the first terminal device receives the configuration information sent by the network device may include that: the terminal device receives fifth configuration information sent by the network device before a first time period, here, the fifth configuration information is used to indicate a transmission resource available for each of the M beam groups during the first time period; and the terminal device receives sixth configuration information sent by the network device before a second time period, here, the sixth configuration information is used to indicate a transmission resource available for each of the M beam groups during the second time period and the second time period is different from the first time period.

In a third aspect, there is provided a device for wireless communication, which includes units configured to execute each step of the method for wireless communication in the first aspect and each implementation mode of the first aspect.

In a fourth aspect, there is provided a device for wireless communication, which includes units configured to execute each step of the method for wireless communication in the second aspect and each implementation mode of the second aspect.

In a fifth aspect, there is provided a device for wireless communication, which includes a memory and a processor. The memory is configured to store a computer program and the processor is configured to call, from the memory, and run the computer program to enable a network device to execute any method for wireless communication in the first aspect and each implementation mode thereof.

In a sixth aspect, there is provided a device for wireless communication, which includes a memory and a processor. The memory is configured to store a computer program and the processor is configured to call, from the memory, and run the computer program to enable a terminal device to execute any method for wireless communication in the second aspect and each implementation mode thereof.

In a seventh aspect, there is provided a computer program product, which includes a computer program code, the computer program code being run by a processing unit and sending unit or processor and sender of a network device to enable the network device to execute any method for wireless communication in the first aspect and each implementation mode thereof.

In an eighth aspect, there is provided a computer program product, which includes a computer program code, the computer program code is run by a receiving unit and processing unit or receiver and processor of a terminal to enable the terminal device to execute any method for wireless communication in the second aspect and each implementation mode thereof.

In a ninth aspect, there is provided a computer-readable storage medium, which stores a program, the program enables a network device to execute any method for wireless communication in the first aspect and each implementation mode thereof.

In a tenth aspect, there is provided a computer-readable storage medium, which stores a program, the program enables a terminal device to execute any method for wireless communication in the second aspect and each implementation mode thereof.

BRIEF DESCRIPTION OF DRAWINGS

In order to describe the technical solutions of the embodiments of the disclosure more clearly, the drawings required to be used in the embodiments of the disclosure will be simply introduced below. It is apparent that the drawings described below are only some embodiments of the disclosure. Other drawings may further be obtained by those of ordinary skill in the art according to these drawings without creative work.

DETAILED DESCRIPTION

Figure 1:
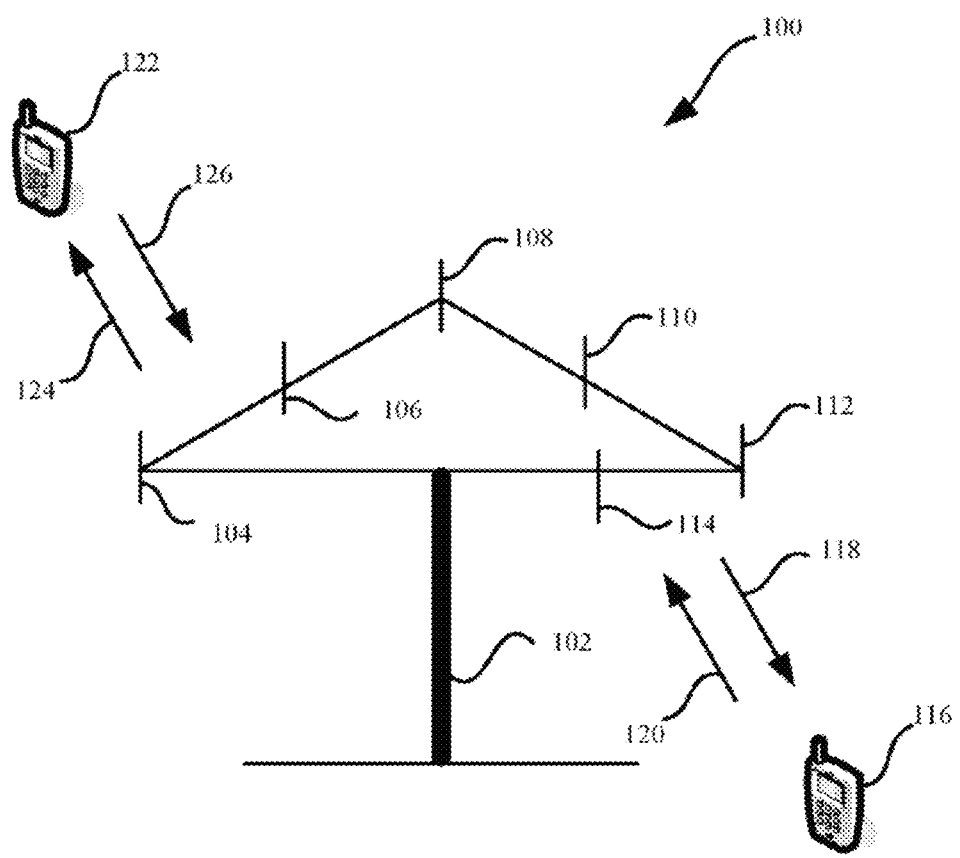
FIG. 1 is a schematic architecture diagram of an example of a communication system to which a method and device for wireless communication according to the embodiments of the disclosure are applied.

The technical solutions in the embodiments of the disclosure will be clearly and completely described below in combination with the drawings in the embodiments of the disclosure.

Terms "component", "module", "system" and the like used in the specification are adopted to represent a computer-related entity, hardware, firmware, a combination of hardware and software, software or software in execution. For example, a component may be, but not limited to, a process running on a processor, the processor, an object, an executable file, an execution thread, a program and/or a computer. The drawings illustrate that an application running on computing equipment and the computing equipment may both be components. One or more components may reside in a process or an execution thread, and the components may be located on a computer and/or distributed between two or more computers. In addition, these components may be executed from various computer-readable media with various data structures stored thereon. The "components" may communicate through local or remote processes according to, for example, signals having one or more data packets (for example, data from one component interacting with another component in a local system, distributed system, and/or across a network such as the Internet with other systems by way of the signal).

It is to be understood that the technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an Advanced LTE (LTE-A) system, a Universal Mobile Telecommunication System (UMTS) and a next-generation communication system.

Generally speaking, connections supported by a conventional communication system are usually limited in number and also easy to implement. However, with evolution of communication technologies, a mobile communication system will not only support conventional communication but also support, for example, Device to Device (D2D) communication, Machine to Machine (M2M) communication, Machine Type Communication (MTC) and Vehicle to Vehicle (V2V) communication.

Each embodiment of the disclosure is described in combination with a terminal device. The terminal device may also be called User Equipment (UE), an access terminal, a user unit, a user Station (ST), a mobile radio ST, a mobile ST, a remote ST, a remote terminal, a mobile device, a user terminal, a terminal, a wireless communication device, a user agent or a user device. The terminal device may be an ST in a Wireless Local Area Network (WLAN), and may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the next-generation communication system, for example, a future 5th-Generation (5G) network, a terminal device in a future evolved Public Land Mobile Network (PLMN) or the like.

Exemplarily but unlimitedly, in the embodiments of the disclosure, the terminal device may also be a wearable device. The wearable device may also be called a wearable intelligent device and is a generic term of wearable devices developed by applying wearable technology to perform intelligentization designing on daily wearing products, for example, glasses, gloves, watches, clothes and shoes. The wearable device is a portable device directly worn or integrated to clothes or accessory of a user. The wearable device not only is a hardware device but also realizes powerful functions through software support, data interaction and cloud interaction. Generalized wearable intelligent device includes, for example, intelligent watches or intelligent glasses with complete functions and large sizes and capable of realizing all or part of functions independently of intelligent phones, and for example, various types of intelligent bracelet and intelligent jewelries of which each is dedicated to application functions of a certain type and required to be matched with other devices such as intelligent phones for use.

In addition, each embodiment of the disclosure is described in combination with a network device. The network device may be a device, for example, a network device, configured to communicate with a mobile device, and the network device may be an Access Point (AP) in the WLAN, a Base Transceiver Station (BTS) in the GSM or CDMA, may also be a NodeB (NB) in WCDMA, and may further be an Evolutional Node B (eNB or eNodeB) in LTE, or a relay station or AP, or a vehicle-mounted device, a wearable device, a network device in the future 5G network, a network device in the future evolved PLMN or the like.

Moreover, in the embodiments of the disclosure, the terminal device may perform wireless communication in a cell. The cell may be a cell corresponding to the network device (for example, a base station), and the cell may belong to a macro eNB and may also be a base station corresponding to a small cell. Herein, the small cell may include: a metro cell, a micro cell, a pico cell, a femto cell and the like. These small cells have the characteristics of small coverage and low transmitted power and are applied to provision of high-rate data transmission service.

Furthermore, multiple cells may simultaneously work on the same frequency on a carrier in an LTE system, and in some special scenarios, concepts of carrier and cell in the LTE system may also be considered to be equivalent. For example, in a Carrier Aggregation (CA) scenario, when a secondary carrier is configured for UE, a carrier index of the secondary carrier and a cell identify (ID) of a secondary cell working on the secondary carrier may both be carried, and under this condition, the concepts of carrier and cell may be considered to be equivalent. For example, for the UE, access to a carrier and access to a cell are equivalent.

A method and device provided in the embodiments of the disclosure may be applied to a terminal device or a network device. The terminal device or the network device includes a hardware layer, an operating system layer running on the hardware layer and an application layer running on the operating system layer. The hardware layer includes hardware such as a Central Processing Unit (CPU), a Memory Management Unit (MMU) and a memory (also called a main memory). The operating system may be any one or more computer operating systems implementing service processing through processes, for example, a Linux operating system, a Unix operating system, an Android operating system, an iOS operating system or a windows operating system. The application layer includes an application such as a browser, a contact list, word processing software and instant messaging software. Moreover, a specific structure of an performing entity of the method for wireless communication in the embodiments of the disclosure is not specially limited in the embodiments of the disclosure as long as a program recording a code for the method for wireless communication of the embodiments of the disclosure may be run to implement communication according to the method for wireless communication of the embodiments of the disclosure. For example, the performing entity of the method for wireless communication of the embodiments of the disclosure may be the terminal device or the network device, or, a function module capable of calling the program and executing the program in the terminal device or the network device.

In addition, each aspect or characteristic of the embodiments of the disclosure may be implemented into a method, a device or a product with a standard programing and/or using an engineering technology. Term "product" used in the application covers a computer program which may be accessed from any computer-readable device, carrier or medium. For example, the computer-readable medium may include, but not limited to: a magnetic storage device (for example, a hard disk, a floppy disk or a magnetic tape), an optical disk (for example, a Compact Disk (CD) and a Digital Versatile Disk (DVD)), a smart card and a flash memory (for example, an Erasable Programmable Read-Only Memory (EPROM), a card, a stick or a key driver). In addition, various storage media described in the disclosure may represent one or more devices and/or other machine-readable media configured to store information. Term "machine-readable medium" may include, but not limited to, a wireless channel and various other media capable of storing, including and/or carrying instructions and/or data.

FIG. 1 is a schematic diagram of a wireless communication system to which the embodiments of the disclosure are applied. As illustrated in FIG. 1, the communication system 100 includes a network device 102, and the network device 102 may include one antenna or multiple antennae, for example, antennae 104, 106, 108, 110, 112 and 114. In addition, the network device 102 may additionally include a sender chain and a receiver chain. Those of ordinary skill in the art may understand that each of the sender chain and the receiver chain may include multiple components (for example, a processor, a modulator, a multiplexer, a demodulator, a demultiplexer or an antenna) related to signal sending and receiving.

The network device 102 may communicate with multiple terminal devices (for example, a terminal device 116 and a terminal device 122). However, it can be understood that the network device 102 may communicate with any number of terminal devices like the terminal device 116 or 122. The terminal devices 116 and 122 may be, for example, cell phones, intelligent phones, portable computers, handheld communication devices, handheld computing devices, satellite radio devices, global positioning systems, PDAs and/or any other suitable device configured for communication in the wireless communication system 100.

As illustrated in FIG. 1, the terminal device 116 communicates with the antennae 112 and 114, and the antennae 112 and 114 send information to the terminal device 116 through a forward link 118 (also called a downlink) and receive information from the terminal device 116 through a reverse link 120 (also called an uplink). In addition, the terminal device 122 communicates with the antennae 104 and 106, and the antennae 104 and 106 send information to the terminal device 122 through a forward link 124 and receive information from the terminal device 122 through a reverse link 126.

For example, in a Frequency Division Duplex (FDD) system, for example, the forward link 118 and the reverse link 120 may use different frequency bands, and the forward link 124 and the reverse link 126 may use different frequency bands.

For another example, in a Time Division Duplex (TDD) system and a full duplex system, the forward link 118 and the reverse link 120 may use the same frequency band, and the forward link 124 and the reverse link 126 may use the same frequency band.

Each antenna (or an antenna group formed by multiple antennae) and/or region designed for communication are/is called sectors/a sector of the network device 102. For example, the antenna group may be designed to communicate with terminal devices in a sector of a coverage area of the network device 102. The network device may send signals to all the terminal devices in the corresponding sector through a single antenna. In a process that the network device 102 communicates with the terminal devices 116 and 122 through the forward links 118 and 124 respectively, a sending antenna of the network device 102 may also use beamforming to improve signal-to-noise ratios of the forward links 118 and 124. In addition, compared with a manner that the network device sends signals to all the terminal devices in the corresponding sector through the single antenna, when the network device 102 sends signals to the terminal devices 116 and 122 randomly scattered in the related coverage area by use of beamforming, a mobile device in a neighbor cell may be interfered less.

In a given time, the network device 102, the terminal device 116 or the terminal device 122 may be a wireless communication sending device and/or a wireless communication receiving device. When data is sent, the wireless communication sending device may code the data for transmission. Specifically, the wireless communication sending device may acquire (for example, generation, receiving from another communication device or storing in a memory) a certain number of data bits to be sent to the wireless communication receiving device through a channel. The data bits may be included in a transmission block (or multiple transmission blocks) of the data, and the transmission block may be segmented to generate multiple code blocks.

In addition, the communication system 100 may be a PLMN network, a D2D network, an M2M network or another network. FIG. 1 is only a simplified schematic diagram listed as an example, and the network may further include another network device which is not presented in FIG. 1.

Figure 2:
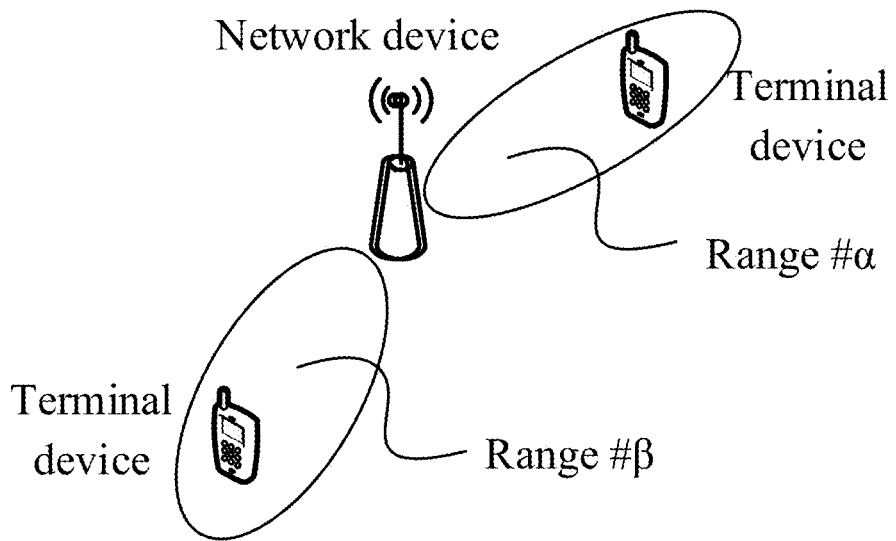
FIG. 2 is a schematic architecture diagram of another example of a communication system to which a method and device for wireless communication according to the embodiments of the disclosure are applied.

In the embodiments of the disclosure, the network device may form multiple beams through one or more antennae, for example, by regulating direction angles (angles in a horizontal direction) and downtilt angles (angles in a vertical direction) of the antennae, here, each of the multiple beams has coverage. For example, as illustrated in FIG. 2, it is assumed that coverage of a beam (recorded hereinafter as beam #α for convenient understanding and distinguishing) of multiple beams used by the network device is a range #α and, moreover, it is assumed that coverage of another beam (recorded hereinafter as beam #β for convenient understanding and distinguishing) of the multiple beams used by the network device is a range #β. Then, in the embodiments of the disclosure, for example, the range #α and the range #β may be different, or, coverage of the range #α is not overlapped with coverage of the range #β.

For another example, the range #α and the range #β may be partially identical, or, the range #α is partially overlapped with the range #β.

For another example, the range #α and the range #β may be completely identical, or, the range #α is completely overlapped with the range #β. Moreover, in the embodiments of the disclosure, the size of the range #α may be larger than the size of the range #β; or, the size of the range #α may also be smaller than the size of the range #β; or, the size of the range #α may also equal to the size of the range #β. There are no special limits made in the disclosure.

In the embodiments of the disclosure, the terminal device may use one beam for communication and may also use multiple beams for communication. There are no special limits made in the disclosure. In the embodiments of the disclosure, a beam group may include each beam used by the same terminal device (for example, during the same time period).

Moreover, in the embodiments of the disclosure, transmission resources available for one or more beams of the multiple beams used by the network device may be the same, or the transmission resources available for any two beams of the multiple beams used by the network device may be different. There are no special limits made in the disclosure. Under this condition, in the embodiments of the disclosure, a beam group may include each beam for which the same transmission resource is available (for example, during the same time period).

In the embodiments of the disclosure, the terminal device, before using a certain beam group (specifically, one or more beams in the beam group) for service transmission, is required to learn a transmission resource available for the beam group.

In the embodiments of the disclosure, "the transmission resource available for the beam group" may refer to that the transmission resource is allocated for the beam group and the beam group may select to use all resources of the transmission resource and may also select to use part resources of the transmission resource.

Moreover, in the embodiments of the disclosure, each terminal device may learn, through a similar process, a transmission resource available for a beam group where a used beam is located. For convenient understanding and description, descriptions will be made below with a process through which a terminal device #A (i.e., an example of a first terminal device) learns transmission resources available for a beam group #1~beam group #M where a used beam #1~a used beam #N are located as an example.

Herein, and N≥1 and M≥1. In the embodiments of the disclosure, multiple beams (two or more than two) of the beam #1~the beam #N may belong to the same beam group (namely N<M), or, any two beams of the beam #1~the beam #N belong to different beam groups (namely N=M).

Figure 3:
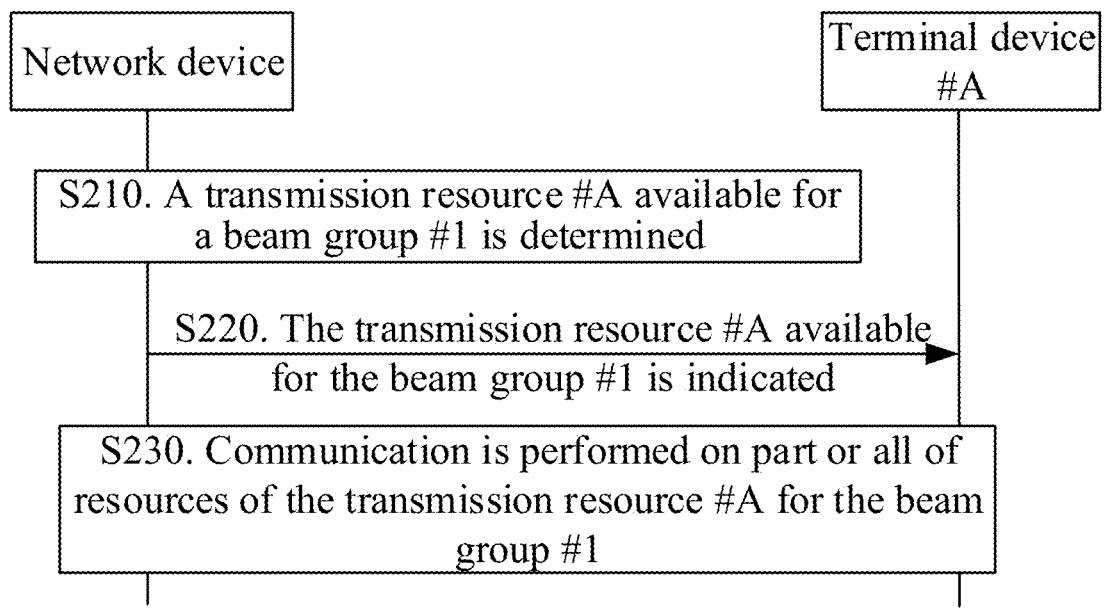
FIG. 3 is a schematic interaction diagram of a method for wireless communication according to an embodiment of the disclosure.

FIG. 3 illustrates an interaction process through which the network device and the terminal device #A determine M beam groups (the beam group #1~the beam group #M).

As illustrated in FIG. 3, in S210, the network device may determine a transmission resource available for each of the M beam groups.

Herein, a similar method and process is adopted to determine the transmission resource for each beam group. For convenient understanding and description, descriptions will be made below with a method and process for determining the transmission resource for the beam group #1 as an example.

At first, an opportunity for determination and transmission of the transmission resource for the beam group #1 by the network device will be described.

For example, in the embodiments of the disclosure, the network device may periodically determine and transmit the transmission resource for the beam group #1. That is, in the embodiments of the disclosure, a time-domain resource used by the communication system may be divided into multiple periods. The network device may determine and transmit the transmission resource for the beam group #1 at a certain moment in each period (for example, a starting moment of the period).

For another example, in the embodiments of the disclosure, the network device may be triggered to determine and transmit the transmission resource for the beam group #1. That is, in the embodiments of the disclosure, the network device may determine and transmit the transmission resource for the beam group #1 responsive to it is determined that a condition related to the beam group #1 is met.

Exemplarily but unlimitedly, in the embodiments of the disclosure, the condition related to the beam group #1 may be determined according to a requirement related to a service carried on one or more beams in the beam group #1.

Therefore, after the requirement related to the service carried on the one or more beams in the beam group #1 changes (for example, a change in the requirement related to the service carried on the one or more beams in the beam group #1 is greater or equal to a specified change range), the network device may determine that the transmission resource for the beam group #1 is required to be re-determined and retransmitted.

Moreover, exemplarily but unlimitedly, in the embodiments of the disclosure, the requirement related to the service carried on the one or more beams in the beam group #1 may be determined on the basis of information related to the one or more beams in the beam group #1.

Herein, the information related to the one or more beams in the beam group #1 may include one or more of the following parameters.

A parameter #1: the number of terminal devices within coverage of the one or more beams in the beam group #1.

For example, if the number of the terminal devices within the coverage of the one or more beams in the beam group #1 increases, the network device may determine that the transmission resource for the beam group #1 is required to be re-determined and retransmitted.

Specifically, if the number of the terminal devices within the coverage of the one or more beams in the beam group #1 increases to exceed a specified number threshold #A, the network device may determine that the transmission resource for the beam group #1 is required to be re-determined and retransmitted.

Or, if a value Δ#A by which the number of the terminal devices within the coverage of the one or more beams in the beam group #1 increases is greater or equal to a specified number threshold #B, the network device may determine that the transmission resource for the beam group #1 is required to be re-determined and retransmitted.

For another example, if the number of the terminal devices within the coverage of the one or more beams in the beam group #1 decreases, the network device may determine that the transmission resource for the beam group #1 is required to be re-determined and retransmitted.

Specifically, if the number of the terminal devices within the coverage of the one or more beams in the beam group #1 decreases to be less than a specified number threshold #C, the network device may determine that the transmission resource for the beam group #1 is required to be re-determined and retransmitted.

Or, if a value Δ#B by which the number of the terminal devices within the coverage of the one or more beams in the beam group #1 decreases is greater or equal to a specified number threshold #D, the network device may determine that the transmission resource for the beam group #1 is required to be re-determined and retransmitted.

A parameter #2: a volume of a service transmitted through the beam in the beam group #1.

For example, if the volume of the service transmitted through the beam in the beam group #1 increases, the network device may determine that the transmission resource for the beam group #1 is required to be re-determined and retransmitted.

Specifically, if the volume of the service transmitted through the beam in the beam group #1 increases to exceed a specified number threshold #E, the network device may determine that the transmission resource for the beam group #1 is required to be re-determined and retransmitted.

Or, if a value Δ#C by which the volume of the service transmitted through the beam in the beam group #1 increases is greater or equal to a specified number threshold #F, the network device may determine that the transmission resource for the beam group #1 is required to be re-determined and retransmitted.

For another example, if the volume of the service transmitted through the beam in the beam group #1 decreases, the network device may determine that the transmission resource for the beam group #1 is required to be re-determined and retransmitted.

Specifically, if the volume of the service transmitted through the beam in the beam group #1 decreases to be less than a specified number threshold #G, the network device may determine that the transmission resource for the beam group #1 is required to be re-determined and retransmitted.

Or, if a value Δ#D by which the volume of the service transmitted through the beam in the beam group #1 decreases is greater or equal to a specified number threshold #H, the network device may determine that the transmission resource for the beam group #1 is required to be re-determined and retransmitted.

A parameter #3: a service type of the service transmitted through the beam in the beam group #1.

For example, if the service type of the service transmitted through the one or more beams in the beam group #1 changes, the network device may determine that the transmission resource for the beam group #1 is required to be re-determined and retransmitted.

It is to be understood that the parameters, listed above, configured for the network device to determine whether the transmission resource available for a certain beam group is required to be re-determined are only exemplarily described and not intended to limit the disclosure and other parameters capable of enabling the network device to determine whether the transmission resource available for the beam group is required to be re-determined all fall within the scope of protection of the disclosure.

A method by which the network device determines the transmission resource for the beam group #1 will be described below in detail.

Exemplarily but unlimitedly, in the embodiments of the disclosure, the network device may determine, according to the information related to the one or more beams in the beam group #1, the transmission resource for the beam group #1, for example, a size of the transmission resource, or a position of the transmission resource in a communication resource provided by the system.

For example, the network device may determine whether to increase or decrease the transmission resource for the beam group #1 according to the information related to the one or more beams in the beam group #1.

Exemplarily but unlimitedly, in the embodiments of the disclosure, the above parameter #1—parameter #3 may be listed as the information related to the one or more beams in the beam group #1.

Specifically, when the information related to the one or more beams in the beam group #1 is the number #α of the terminal devices within the coverage of the one or more beams in the beam group #1 (i.e., the parameter #1), the network device may estimate, according to the number #α, a size of a transmission resource (for example, time-domain resource or frequency-domain resource) meeting service access requirements of all the terminal devices within the coverage of the one or more beams in the beam group #1 and determine the size of the transmission resource for the beam group #1 according to the estimated size of the transmission resource. For example, the network device may make the size of the transmission resource for the beam group #1 approximate to the estimated size of the transmission resource. Specifically, the network device may make a difference between the size of the transmission resource for the beam group #1 and the estimated size of the transmission resource less than or equal to a preset difference threshold.

When the information related to the one or more beams in the beam group #1 is the volume #β of the service transmitted through the one or more beams in the beam group #1 (i.e., the parameter #2), the network device may estimate, according to the volume #β, a size of a transmission resource (for example, time-domain resource or frequency-domain resource) meeting a requirement of the volume #β of the service transmitted through the one or more beams in the beam group #1 and determine the size of the transmission resource for the beam group #1 according to the estimated size of the transmission resource. For example, the network device may make the size of the transmission resource for the beam group #1 approximate to the estimated size of the transmission resource. Specifically, the network device may make a difference between the size of the transmission resource for the beam group #1 and the estimated size of the transmission resource less than or equal to the preset difference threshold.

When the information related to the one or more beams in the beam group #1 is the service type #γ of the service transmitted through the one or more beams in the beam group #1 (i.e., the parameter #3), the network device may estimate, according to the service type #γ, a size of a transmission resource (for example, time-domain resource or frequency-domain resource) meeting a requirement of the service type #γ of the service transmitted through the one or more beams in the beam group #1 and determine the size of the transmission resource for the beam group #1 according to the estimated size of the transmission resource. For example, the network device may make the size of the transmission resource for the beam group #1 approximate to the estimated size of the transmission resource. Specifically, the network device may make a difference between the size of the transmission resource for the beam group #1 and the estimated size of the transmission resource less than or equal to the preset difference threshold.

It is to be understood that the parameters, listed above, configured for the network device to determine the transmission resource available for a certain beam group are only exemplarily described and not intended to limit the disclosure and other parameters capable of enabling the network device to determine the transmission resource available for the beam group all fall within the scope of protection of the disclosure.

Moreover, using manners, listed above, for the parameters configured for the network device to determine the transmission resource available for a certain beam group are only exemplarily described and not intended to limit the disclosure and other manners capable of enabling the network device to determine the transmission resource available for the beam group on the basis of the parameters all fall within the scope of protection of the disclosure. For example, the network device may also determine a requirement of the service carried on the beam group #1 on channel quality on the basis of the one or more parameters, and determine the transmission resource for the beam group #1 (for example, a position of a frequency-domain resource in the transmission resource or a position of a time-domain resource in the transmission resource) according to the requirement on the channel quality.

As described above, in S210, the network device may determine the transmission resource for the beam group #1 used by the terminal device #A. The transmission resource is recorded hereinafter as a transmission resource #A for convenient understanding and description.

In S220, the network device sends to the terminal device #A configuration information that is used to indicate the transmission resource #A, which is determined by the network device above, for the beam group #1.

Exemplarily but unlimitedly, in the embodiments of the disclosure, the configuration information may be used to indicate a configuration of the transmission resource #A.

For example, in the embodiments of the disclosure, the transmission resource #A may include a frequency-domain resource #A-1.

Under this condition, the configuration information may be used to indicate at least one of: a size of the frequency-domain resource #A-1, or a position of the frequency-domain resource #A-1 in a frequency-domain resource provided by the communication system.

Exemplarily but unlimitedly, in the embodiments of the disclosure, the frequency-domain resource provided by the communication system may be divided into multiple frequency-domain units in a frequency domain and, moreover, for example, a subcarrier may be listed as the frequency-domain unit. Therefore, the configuration information may be an identifier used to indicate whether each frequency-domain unit (for example, subcarrier) belongs to the frequency-domain resource #A-1, for example, bit mapping (Bit Map) in the frequency domain.

For another example, in the embodiments of the disclosure, the transmission resource #A may include a time-domain resource #A-2.

Under this condition, the configuration information may be used to indicate at least one of: a size of the time-domain resource #A-2, or a position of the time-domain resource #A-2 in a time-domain resource provided by the communication system.

Exemplarily but unlimitedly, in the embodiments of the disclosure, the time-domain resource provided by the communication system may be divided into multiple time units in a time domain and, moreover, for example, a symbol, a slot, a Transmission Time Interval (TTI) or a subframe may be listed as the time unit. Therefore, the configuration information may be an identifier used to indicate whether each time unit belongs to the time-domain resource #A-2, for example, bit mapping in the time domain.

In the embodiments of the disclosure, the M beam groups may further include another beam group, in addition to the beam group #1. Under this condition, the configuration information may further be used to indicate a mapping relationship (recorded hereinafter as mapping relationship #0 for convenient understanding and distinguishing) between the beam group #1 and the transmission resource #A. Therefore, the terminal device may determine that the transmission resource #A is the transmission resource available for the beam group #1 on the basis of the mapping relationship #0.

In the embodiments of the disclosure, the network device may send the configuration information to multiple terminal devices including the terminal device #A through a PBCH or system information in a broadcast manner.

Or, in the embodiments of the disclosure, the network device may also send the configuration information to the terminal device #A through dedicated signaling, for example, RRC, for the terminal device #A.

In the embodiments of the disclosure, the configuration information may be transmitted in one time. That is, the configuration information may be used to indicate the configuration of the transmission resource #A and the mapping relationship (i.e., the mapping relationship #0) between the beam group #1 and the transmission resource #A.

Or, in the embodiments of the disclosure, the configuration information may also be transmitted in many times (at least twice) in different time periods. This condition will be described below in detail.

A First Manner

In the embodiments of the disclosure, for example, before the terminal device communicates on the basis of a beam and for example, responsive to access of the terminal device to the network device, the network device may send configuration information #A (i.e., an example of first configuration information) to the terminal device. The configuration information #A may be used to indicate configurations of multiple transmission resources including the transmission resource #A.

Therefore, the terminal device may learn, according to the configuration information #A, the configurations of the multiple (for example, Q, Q≥M) transmission resources including the transmission resource #A, for example, at least one of a size or position of each transmission resource in the time domain, at least one of a size or position of each transmission resource in the frequency domain, or at least one of a size or position of each transmission resource in the time domain and the frequency domain.

In the embodiments of the disclosure, there may be one or more pieces of configuration information #A and there are no special limits made in the disclosure. In addition, when there are multiple pieces of configuration information #A, each piece of configuration information #A may be used to indicate configurations of one or more transmission resources. Moreover, the multiple pieces of configuration information #A may be sent at the same time and may also be sent at different time and there are no special limits made in the disclosure.

After the network device determines that the beam group #1 is required to use the transmission resource #A, the network device may send to the terminal device configuration information #B (i.e., an example of second configuration information) used to indicate the transmission resource #A. Therefore, the terminal device may determine that the transmission resource #A is the transmission resource available for the beam group #1 on the basis of the configuration information #B and determine the configuration of the transmission resource #A on the basis of the configuration information #A.

In the embodiments of the disclosure, the Q transmission resources may correspond to Q resource identifiers (IDs) (i.e., an example of first IDs) one to one.

Specifically, in the embodiments of the disclosure, when the M beam groups further includes the other beam group, in addition to the beam group #1, the configuration information #B may further be used to indicate the mapping relationship between the transmission resource #A and the beam group #1.

Exemplarily but unlimitedly, in the embodiments of the disclosure, the configuration information #A may further be used to indicate the resource ID (i.e., an example of the first ID) of each of the multiple transmission resources, namely an ID of a transmission resource may be used to uniquely indicate the transmission resource. That is, exemplarily but unlimitedly, the configuration information #A may include the following information.

[resource_set_1, resource_set_2, . . . , resource_set_K], where resource_set_k is the ID of a transmission resource #k (k=1, 2, . . . , K) and K is the number of the multiple transmission resources.

Under this condition, the configuration information #B may include an ID of the transmission resource #A, or, the configuration information #B may further include a mapping relationship between the ID of the transmission resource #A and an ID of the beam group #1.

Exemplarily but unlimitedly, the configuration information #B may be the resource ID corresponding to the transmission resource #A in [resource_set_1, resource_set_2, . . . , resource_set_K].

A transmission manner for the configuration information #A and the configuration information #B will be described below in detail.

For example, in the embodiments of the disclosure, the network device may send the configuration information #A to the terminal device #A through RRC signaling for the terminal device #A.

Moreover, the network device may send the configuration information #B to the terminal device #A through a MAC CE for the terminal device #A.

Or, the network device may send the configuration information #B to the terminal device #A through DCI for the terminal device #A.

For another example, in the embodiments of the disclosure, the network device may send the configuration information #A to the terminal device #A through a MAC CE for the terminal device #A.

Moreover, the network device may send the configuration information #B to the terminal device #A through DCI for the terminal device #A.

A Second Manner

In the embodiments of the disclosure, for example, before the terminal device communicates on the basis of the beam, and for example, responsive to access of the terminal device to the network device, the network device may send configuration information #C (i.e., an example of third configuration information) to the terminal device. The configuration information #C may be used to indicate a configuration of a transmission resource (for example, a size and position of the transmission resource) in each of multiple (i.e., H, H≥M) transmission resource sets, and mapping relationships between multiple beam groups and the multiple transmission resource sets. Moreover, the transmission resource in each transmission resource set may have an index used to uniquely indicate the transmission resource in the transmission resource set. Each transmission resource set may include at least one transmission resource, the multiple beam groups include the beam group #1 and the transmission resource #A belongs to at least one transmission resource set of the multiple transmission resource sets.

Therefore, the terminal device may learn, according to the configuration information #C, the configurations of the multiple transmission resources including the transmission resource #A, for example, at least one of the size or position of each transmission resource in the time domain, at least one of the size or position of each transmission resource on the frequency domain, or at least one of the size or position of each transmission resource in the time domain and the frequency domain.

In the embodiments of the disclosure, there may be one or more pieces of configuration information #C and there are no special limits made in the disclosure. In addition, when there are multiple pieces of configuration information #C, each piece of configuration information #C may be used to indicate configurations of one or more transmission resources. Moreover, the multiple pieces of configuration information #C may be sent at the same time and may also be sent at different time and there are no special limits made in the disclosure.

Exemplarily but unlimitedly, the configuration information #C may include the following information.

[Beam group_i, resource_set_i_1, resource_set_i_2, . . . , resource_set_i_w], where resource_set_w is an ID of a transmission resource #w (w=1, 2, . . . , W), W is the number of transmission resources in the transmission resource set corresponding to Beam group_i, Beam group_i is an ID of a beam group #i and i ∈[1, M].

After the network device determines that the beam group #1 is required to use the transmission resource #A, the network device may send to the terminal device configuration information #D used to indicate the transmission resource #A. Therefore, the terminal device may determine that the transmission resource #A is the transmission resource available for the beam group #1 on the basis of the configuration information #D and determine the configuration of the transmission resource #A on the basis of the configuration information #C.

Under this condition, the configuration information #D may include the ID of the beam group #1 and an index of the transmission resource #A in the transmission resource set corresponding to the beam group #1.

A transmission manner for the configuration information #C and the configuration information #D will be described below in detail.

For example, in the embodiments of the disclosure, the network device may send the configuration information #C to the terminal device #A through RRC signaling for the terminal device #A.

Moreover, the network device may send the configuration information #D to the terminal device #A through a MAC CE for the terminal device #A.

Or, the network device may send the configuration information #D to the terminal device #A through DCI for the terminal device #A.

For another example, in the embodiments of the disclosure, the network device may send the configuration information #C to the terminal device #A through a MAC CE for the terminal device #A.

Moreover, the network device may send the configuration information #D to the terminal device #A through DCI for the terminal device #A.

In addition, in the embodiments of the disclosure, a transmission resource provided by the communication system includes a transmission resource reserved for a specified channel (for example, a communication channel or a broadcast channel) or a specified service. Moreover, in the communication system, the transmission resource reserved is protected and unavailable for another channel or service. Under this condition, in the embodiments of the disclosure, the transmission resource #A may include no the transmission resource reserved.

Moreover, in the embodiments of the disclosure, the beam group #1 may include multiple beams and the multiple beams may share the transmission resource #A. Therefore, the terminal device #A may perform joint transmission on the multiple beams in the beam group #1.

Or, in the embodiments of the disclosure, the transmission resource #A available for the beam group #1 may be overlapped with (for example, partially identical) a transmission resource available for another beam group, or, the transmission resource #A available for the beam group #1 may be different from the transmission resource available for another beam group. There are no special limits made in the disclosure.

In the embodiments of the disclosure, the transmission resource #A may include a transmission resource (i.e., an example of a first transmission resource) used to carry a control channel.

Moreover, in the embodiments of the disclosure, the transmission resource #A may further include a transmission resource (i.e., an example of a second transmission resource) used to carry a data channel.

Herein, part resources of the transmission resource (i.e., the first transmission resource) carrying the control channel may also be used to carry the data channel.

Moreover, part resources of the transmission resource (i.e., the second transmission resource) carrying the data channel may also be used to carry the control channel.

Herein, the transmission resource (i.e., the first transmission resource) carrying the control channel and transmission resource (i.e., the second transmission resource) carrying the data channel in the transmission resource #A may be the same and may also be different. There are no special limits made in the disclosure.

In the embodiments of the disclosure, beams configured for the control channel and the data channel may be different. For example, transmission resources on two beams are configured for the control channel and a transmission resource on one beam is configured for the data channel.

Moreover, transmission resources for a beam (i.e., an example of a first beam) in the beam group #1 and another beam (i.e., an example of a second beam) in the beam group #1 may be the same and may also be different. There are no special limits made in the disclosure.

If the available transmission resource presently acquired by the terminal device through the DCI and corresponding to multiple-subframe or multiple-slot or multiple-mini-slot/multiple-sub slot scheduling is inconsistent with the existing configuration, the terminal device may determine the transmission resource for the beam on the basis of an indication of present latest DCI.

Specifically, in the embodiments of the disclosure, the transmission resource #A may be a transmission resource available for the beam group #1 during a time period #A (i.e., an example of a first time period).

Before a time period #B (i.e., an example of a second time period), the network device may re-determine and retransmit a transmission resource #B available for the beam group #1 during the time period #B.

Herein, a determination and transmission process for the transmission resource #B may be similar to a determination and transmission process for the transmission resource #A and detailed descriptions thereof are omitted herein to avoid elaborations.

In S230, the network device and the terminal device #A may communicate by use of the transmission resource #A through the beam group #1.

It is to be noted that if the terminal device receives a transmission resource #Y, which is indicated by other DCI (recorded hereinafter as DCI #2 for convenient understanding and distinguishing), for the beam group #1 after, for example, receiving, through DCI (recorded hereinafter as DCI #1 for convenient understanding and distinguishing), the configuration information used to indicate the transmission resource #A for the beam group #1, the terminal device may determine a transmission resource (i.e., the transmission resource #Y) for the beam group #1 on the basis of the DCI #2.

In addition, the transmission resource #A and the transmission resource #Y may be completely identical, may also be partially identical and may further be different. There are no special limits made in the disclosure.

The network device determines transmission resources available for one or more beams and indicates the transmission resources available for the one or more beams to the terminal device through the configuration information, so that the network device may be supported to change the transmission resources available for the beams according to a requirement, different service requirements may be met and practicability and user experience of a multi-beam system are improved.

The methods for wireless communication according to the embodiments of the disclosure are described above in combination with FIG. 1 to FIG. 3 in detail, and devices for wireless communication according to the embodiments of the disclosure will be described below in combination with FIG. 4 and FIG. 5 in detail.

Figure 4:
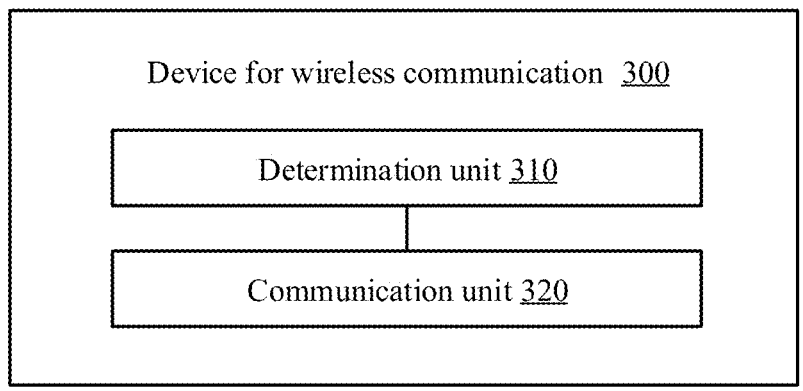
FIG. 4 is a schematic block diagram of an example of a device for wireless communication according to an embodiment of the disclosure.

FIG. 4 is a schematic block diagram of a device 300 for wireless communication according to an embodiment of the disclosure. As illustrated in FIG. 4, the device 300 includes a determination unit 310 and a communication unit 320.

The determination unit 310 is configured to determine transmission resources available for M beam groups, here, each beam group includes at least one beam of at least two beams and M≥1.

The communication unit 320 is configured to send configuration information to a first terminal device, here, the configuration information is used to indicate the transmission resource available for each beam group.

Optionally, the communication unit 320 is specifically configured to send the configuration information to the first terminal device through dedicated signaling for the first terminal device; or the communication unit 320 is specifically configured to send the configuration information to multiple terminal devices including the first terminal device through a PBCH or a system broadcast message.

Optionally, the configuration information is specifically used to indicate one-to-one mapping relationships between the M beam groups and M transmission resources.

Optionally, the communication unit is configured to send first configuration information to the first terminal device, here, the first configuration information is used to indicate configurations of multiple transmission resources and the first configuration information is used to indicate one-to-one mapping relationships between the multiple transmission resources and Q first identifiers (IDs).

The communication unit is further configured to send second configuration information to the first terminal device, here, the second configuration information includes a first ID corresponding to the transmission resource available for each of the M beam groups.

Optionally, the communication unit is configured to send the first configuration information to the first terminal device through RRC signaling.

The communication unit is configured to send the second configuration information to the first terminal device through a MAC CE or DCI.

Optionally, the communication unit is configured to send the first configuration information to the first terminal device through a MAC CE.

The communication unit is configured to send the second configuration information to the first terminal device through DCI.

Optionally, the communication unit is configured to send third configuration information to the first terminal device, here, the third configuration information is used to indicate a configuration of a transmission resource in each of H transmission resource sets, the third configuration information is used to indicate one-to-one mapping relationships between H beam groups including the M beam groups and the H transmission resource sets, and the third configuration information is used to indicate an index of a transmission resource t in a transmission resource set h in the transmission resource set h, here, each of the H beam groups includes at least one beam, each transmission resource set includes at least one transmission resource, h ∈[1, H], t ∈[1, T], T is the number of transmission resources in the transmission resource set h, T≥1 and H≥1.

The communication unit is further configured to send fourth configuration information to the first terminal device, here, the fourth configuration information includes an identifier of each of the M beam groups, and the fourth configuration information is used to indicate an index of the transmission resource available for a beam group i in the transmission resource set corresponding to the beam group i and i ∈[1, M].

Optionally, the communication unit is configured to send the third configuration information to the first terminal device through RRC signaling.

The communication unit is configured to send the fourth configuration information to the first terminal device through a MAC CE or DCI.

Optionally, the communication unit is configured to send the third configuration information to the first terminal device through a MAC CE.

The communication unit is configured to send the fourth configuration information to the first terminal device through DCI.

Optionally, the transmission resource includes a time-domain transmission resource.

Optionally, a time-domain resource available for a communication system where the device is located is divided into at least two time units in a time domain, and the configuration information is specifically used to indicate a position of a time unit in the transmission resource available for each beam group in the at least two time units.

Optionally, the transmission resource includes a frequency-domain transmission resource.

Optionally, a frequency-domain resource available for the communication system where the device is located is divided into at least two frequency-domain units, and the configuration information is specifically used to indicate a position of a frequency-domain unit in the transmission resource available for each beam group in the at least two frequency-domain units.

Optionally, the transmission resource available for each beam group includes no transmission resource reserved by the communication system, and the transmission resource reserved by the communication system is only used to transmit a specified service or a specified channel.

Optionally, the transmission resources available for a first beam and second beam in the M beam groups are partially overlapped or completely overlapped.

Optionally, the transmission resource available for a first beam group of the M beam groups includes at least one of: a first transmission resource for a control channel carrying the first beam group or a second transmission resource for a data channel carrying the first beam group.

Optionally, the determination unit 310 is specifically configured to determine a transmission resource available for each of the M beam groups during a first time period and determine a transmission resource available for each of the M beam groups during a second time period.

The communication unit 320 is specifically configured to send fifth configuration information to the first terminal device before the first time period, here, the fifth configuration information is used to indicate the transmission resource available for each of the M beam groups during the first time period, and send sixth configuration information to the first terminal device before the second time period, here, the sixth configuration information is used to indicate the transmission resource available for each of the M beam groups during the second time period and the second time period is different from the first time period.

The device 300 for wireless communication according to the embodiment of the disclosure may correspond to a network device in the method of the embodiment of the disclosure, and moreover, each unit, i.e., module, in the device 300 for wireless communication and the other above-mentioned operations and/or functions are intended to implement the corresponding flows executed by the network device in the method 200 in FIG. 3 and will not be elaborated herein for simplicity.

Figure 5:
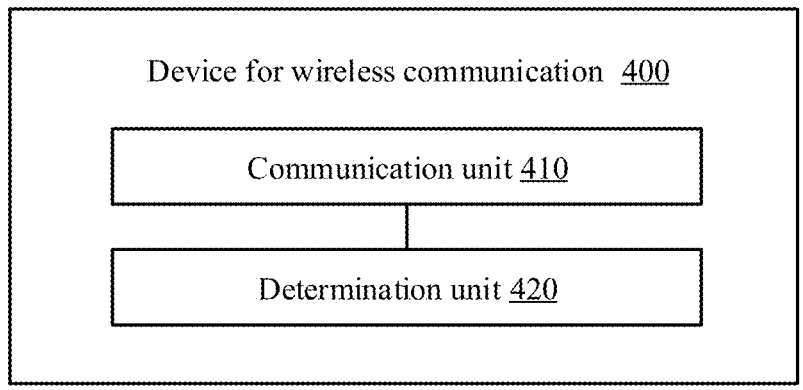
FIG. 5 is a schematic block diagram of another example of a device for wireless communication according to an embodiment of the disclosure.

FIG. 5 is a schematic block diagram of a device 400 for wireless communication according to an embodiment of the disclosure. As illustrated in FIG. 5, the device 400 includes a communication unit 310 and a determination unit 320.

The communication unit 310 is configured to receive configuration information sent by a network device, here, the configuration information is used to indicate a transmission resource available for each of M beam groups, and each beam group includes at least one beam of at least two beams and M≥1.

The determination unit 320 is configured to determine the transmission resource available for each of the M beam groups according to the configuration information.

Optionally, the communication unit 310 is specifically configured to receive the configuration information sent by the network device through dedicated signaling for the device; or the communication unit 310 is specifically configured to receive the configuration information sent to multiple terminal devices including the device by the network device through a PBCH or a system broadcast message.

Optionally, the configuration information is specifically used to indicate one-to-one mapping relationships between the M beam groups and M transmission resources.

Optionally, the communication unit 310 is configured to receive first configuration information sent by the network device, here, the first configuration information is used to indicate configurations of multiple transmission resources and the first configuration information is used to indicate one-to-one mapping relationships between the multiple transmission resources and Q first identifiers (IDs).

The communication unit 310 is specifically configured to receive second configuration information sent by the network device, here, the second configuration information includes a first ID corresponding to the transmission resource available for each of the M beam groups.

Optionally, the communication unit 310 is specifically configured to receive the first configuration information sent by the network device through RRC signaling.

The communication unit 310 is specifically configured to receive the second configuration information sent by the network device through a MAC CE or DCI.

Optionally, the communication unit 310 is specifically configured to receive the first configuration information sent by the network device through a MAC CE.

The communication unit 310 is specifically configured to receive the second configuration information sent by the network device through DCI.

Optionally, the communication unit 310 is specifically configured to receive third configuration information sent by the network device, here, the third configuration information is used to indicate a configuration of a transmission resource in each of H transmission resource sets, the third configuration information is used to indicate one-to-one mapping relationships between H beam groups including the M beam groups and the H transmission resource sets, and the third configuration information is used to indicate an index of a transmission resource t in a transmission resource set h in the transmission resource set h, here, each of the H beam groups includes at least one beam, each transmission resource set includes at least one transmission resource, h ∈[1, H], t ∈[1, T], T is the number of transmission resources in the transmission resource set h, T≥1 and H≥1.

The communication unit 310 is specifically configured to receive fourth configuration information sent by the network device, here, the fourth configuration information includes an identifier of each of the M beam groups, and the fourth configuration information is used to indicate an index of the transmission resource available for a beam group i in the transmission resource set corresponding to the beam group i and i ∈[1, M].

Optionally, the communication unit 310 is specifically configured to receive the third configuration information sent by the network device through RRC signaling.

The communication unit 310 is specifically configured to receive the fourth configuration information sent by the network device through a MACE CE or DCI.

Optionally, the communication unit 310 is specifically configured to receive the third configuration information sent by the network device through a MAC CE.

The communication unit 310 is specifically configured to receive the fourth configuration information sent by the network device through DCI.

Optionally, the transmission resource includes a time-domain transmission resource.

Optionally, a time-domain resource available for a communication system where the network device is located is divided into at least two time units in a time domain, and the configuration information is specifically used to indicate a position of a time unit in the transmission resource available for each beam group in the at least two time units.

Optionally, the transmission resource includes a frequency-domain transmission resource.

Optionally, a frequency-domain resource available for the communication system where the network device is located is divided into at least two frequency-domain units, and the configuration information is specifically used to indicate a position of a frequency-domain unit in the transmission resource available for each beam group in the at least two frequency-domain units.

Optionally, the transmission resource available for each beam group includes no transmission resource reserved by the communication system, and the transmission resource reserved by the communication system is only used to transmit a specified service or a specified channel.

Optionally, the transmission resources available for a first beam and second beam in the M beam groups are partially overlapped or completely overlapped.

Optionally, the transmission resource available for a first beam group of the M beam groups includes at least one of: a first transmission resource for a control channel carrying the first beam group or a second transmission resource for a data channel carrying the first beam group.

Optionally, the communication unit 310 is specifically configured to receive fifth configuration information sent by the network device before a first time period, here, the fifth configuration information is used to indicate a transmission resource available for each of the M beam groups during the first time period.

The communication unit 310 is specifically configured to receive sixth configuration information sent by the network device before a second time period, here, the fifth configuration information is used to indicate a transmission resource available for each of the M beam groups during the second time period and the second time period is different from the first time period.

The device 400 for wireless communication according to the embodiment of the disclosure may correspond to a first terminal device (for example, a terminal device #A) in the method of the embodiment of the disclosure, and moreover, each unit, i.e., module, in the device 400 for wireless communication and the other abovementioned operations and/or functions are intended to implement the corresponding flows executed by the terminal device #A in the method 200 in FIG. 3 and will not be elaborated herein for simplicity.

The method for wireless communication according to the embodiments of the disclosure are described above in combination with FIG. 1 to FIG. 3 in detail, and devices for wireless communication according to the embodiments of the disclosure will be described below in combination with FIG. 6 and FIG. 7 in detail.

Figure 6:
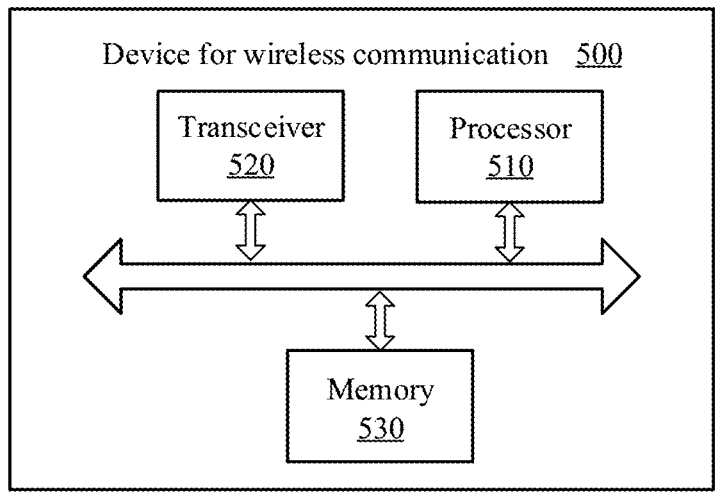
FIG. 6 is a schematic block diagram of an example of a device for wireless communication according to an embodiment of the disclosure.

FIG. 6 is a schematic block diagram of a device 500 for wireless communication according to an embodiment of the disclosure. As illustrated in FIG. 6, the device 500 includes a processor 510 and a transceiver 520. The processor 510 and the transceiver 520 form a communication connection. Optionally, the device 500 further includes a memory 530. The memory 530 and the processor 510 may form a communication connection. The processor 510, the memory 530 and the transceiver 520 may form communication connections. The memory 530 may be configured to store an instruction. The processor 510 is configured to execute the instruction stored in the memory 530 to control the transceiver 520 to send information or a signal.

The processor 510 may correspond to the determination unit 310 in FIG. 4 and the transceiver 520 may correspond to the communication unit 320 in FIG. 4.

The device 500 for wireless communication according to the embodiment of the disclosure may correspond to a network device in the method of the embodiment of the disclosure, and moreover, each unit, i.e., module, in the device 500 for wireless communication and the other abovementioned operations and/or functions are intended to implement the corresponding flows executed by the network device in the method 200 in FIG. 3 and will not be elaborated herein for simplicity.

Figure 7:
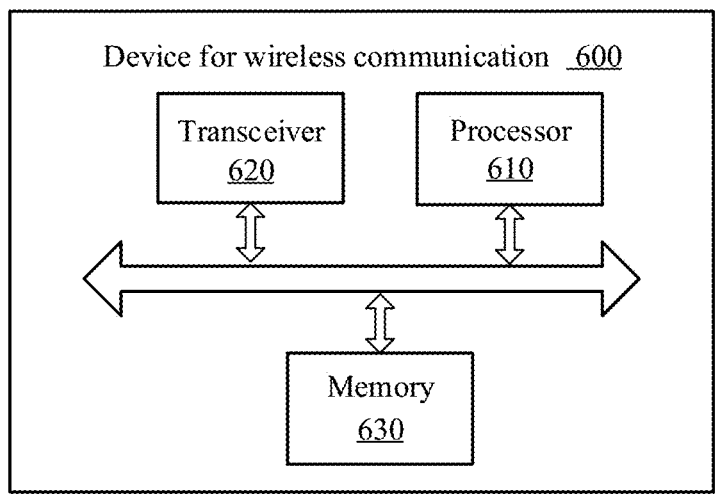
FIG. 7 is a schematic block diagram of another example of a device for wireless communication according to an embodiment of the disclosure.

FIG. 7 is a schematic block diagram of a device 600 for wireless communication according to an embodiment of the disclosure. As illustrated in FIG. 7, the device 600 includes a processor 610 and a transceiver 620. The processor 610 and the transceiver 620 form a communication connection. Optionally, the equipment 600 further includes a memory 630. The memory 630 and the processor 610 may form a communication connection. The processor 610, the memory 630 and the transceiver 620 may form communication connections. The memory 630 may be configured to store an instruction. The processor 610 is configured to execute the instruction stored in the memory 630 to control the transceiver 620 to send information or a signal.

The processor 610 may correspond to the determination unit 410 in FIG. 5 and the transceiver 620 may correspond to the communication unit 420 in FIG. 5.

The device 600 for wireless communication according to the embodiment of the disclosure may correspond to a first terminal device in the method of the embodiment of the disclosure, and moreover, each unit, i.e., module, in the device 600 for wireless communication and the other abovementioned operations and/or functions are intended to implement the corresponding flows executed by the first terminal device in the method 200 in FIG. 3 and will not be elaborated herein for simplicity.

It is to be noted that the method embodiment of the embodiments of the disclosure may be applied to a processor or implemented by the processor. The processor may be an integrated circuit chip with a signal processing capability. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the disclosure may be implemented or executed. The universal processor may be a microprocessor or the processor may also be any conventional processor and the like. The operations of the methods disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically EPROM (EEPROM) and a register. The storage medium is located in a memory, and the processor reads information in the memory, and completes the operations of the methods in combination with hardware.

It can be understood that the memory in the embodiment of the disclosure may be a volatile memory or a nonvolatile memory, or may include both the volatile and nonvolatile memories. The nonvolatile memory may be a ROM, a PROM, an EPROM, an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ES-DRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that term "and/or" in the disclosure is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

It is to be understood that in each embodiment of the embodiments of the disclosure, a magnitude of a sequence number of each process does not mean an execution sequence and the execution sequence of each process should be determined by its function and an internal logic and should not form any limit to an implementation process of the embodiments of the disclosure.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the embodiments of the disclosure.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the embodiments of the disclosure may be integrated into a processing unit, each unit may also exist independently, and two or more than two units may also be integrated into a unit.

When being realized in form of software functional unit and sold or used as an independent product, the function may also be stored in a computer-readable storage medium. Based on such an understanding, the technical solutions of the embodiments of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the embodiments of the disclosure. The abovementioned storage medium includes: various media capable of storing program codes such as a U disk, a mobile hard disk, a ROM, a RAM, a magnetic disk or an optical disk.

The above is only the specific implementation mode of the embodiments of the disclosure and not intended to limit the scope of protection of the embodiments of the disclosure. Any variations or replacements apparent to those skilled in the art within the technical scope disclosed by the embodiments of the disclosure shall fall within the scope of protection of the embodiments of the disclosure. Therefore, the scope of protection of the embodiments of the disclosure shall be subject to the scope of protection of the claims.

The invention claimed is:

1. A method for wireless communication, which is performed in a communication system using at least two beams, the method comprising:
sending, by the network device, configuration information to a first terminal device, wherein the configuration information is used to indicate a transmission resource available for each of M beam groups, each beam group comprises at least one beam of the at least two beams and M≥1, and a first transmission resource available for a first beam group of the M beam groups is used for physical downlink control channel (PDCCH) transmission,
wherein sending, by the network device, the configuration information to the first terminal device comprises:
sending, by the network device, first configuration information to the first terminal device, the first configuration information being used to indicate configurations of Q transmission resources and one-to-one mapping relationships between the Q transmission resources and Q first identifiers (IDs), wherein Q≥M and the Q transmission resources comprise the transmission resources available for the M beam groups; and
sending, by the network device, second configuration information to the first terminal device, the second configuration information indicating the first ID corresponding to the transmission resource available for each of the M beam groups.

2. The method of claim 1, wherein sending, by the network device, the configuration information to the first terminal device comprises:
sending, by the network device, the configuration information to the first terminal device through dedicated signaling for the first terminal device; or
sending, by the network device, the configuration information to a plurality of terminal devices comprising the first terminal device through a Physical Broadcast Channel (PBCH) or a system broadcast message.

3. The method of claim 1, wherein the configuration information is used to indicate one-to-one mapping relationships between the M beam groups and M transmission resources.

4. The method of claim 1, wherein the transmission resource comprises a time-domain transmission resource.

5. The method of claim 4, wherein a time-domain resource available for the communication system where the network device is located is divided into at least two time units in a time domain, and
the configuration information is used to indicate a position of a time unit in the transmission resource available for each beam group in the at least two time units.

6. The method of claim 1, wherein the transmission resource comprises a frequency-domain transmission resource.

7. The method of claim 1, wherein the transmission resource available for each beam group comprises no transmission resource reserved by the communication system, and the transmission resource reserved by the communication system is only used to transmit a specified service or a specified channel.

8. A method for wireless communication, which is performed in a communication system using at least two beams, the method comprising:
receiving, by a first terminal device, configuration information sent by a network device, wherein the configuration information is used to indicate a transmission resource available for each of M beam groups, each beam group comprises at least one beam of the at least two beams and M≥1, and a first transmission resource available for a first beam group of the M beam groups is used for physical downlink control channel (PDCCH) transmission; and
determining, by the first terminal device, the first transmission resource for the PDCCH transmission according to the configuration information, wherein receiving, by the first terminal device, the configuration information sent by the network device comprises:
receiving, by the first terminal device, first configuration information sent by the network device, the first configuration information being used to indicate configurations of Q transmission resources and one-to-one mapping relationships between the Q transmission resources and Q first identifiers (IDs), wherein Q≥M and the Q transmission resources comprise transmission resources available for the M beam groups; and
receiving, by the first terminal device, second configuration information sent by the network device, the second configuration information comprising the first ID corresponding to the transmission resource available for each of the M beam groups.

9. The method of claim 8, wherein receiving, by the first terminal device, the configuration information sent by the network device comprises:
receiving, by the first terminal device, the configuration information sent by the network device through dedicated signaling for the first terminal device; or
receiving, by the first terminal device, the configuration information sent to a plurality of terminal devices comprising the first terminal device by the network device through a Physical Broadcast Channel (PBCH) or a system broadcast message.

10. The method of claim 8, wherein the configuration information is used to indicate one-to-one mapping relationships between the M beam groups and M transmission resources.

11. The method of claim 8, wherein the transmission resource comprises a time-domain transmission resource.

12. The method of claim 11, wherein a time-domain resource available for the communication system where the network device is located is divided into at least two time units in a time domain, and
the configuration information is used to indicate a position of a time unit in the transmission resource available for each beam group in the at least two time units.

13. The method of claim 8, wherein the transmission resource comprises a frequency-domain transmission resource.

14. The method of claim 8, wherein the transmission resource available for each beam group comprises no transmission resource reserved by the communication system, and the transmission resource reserved by the communication system is only used to transmit a specified service or a specified channel.

15. A device for wireless communication, which is configured in a communication system using at least two beams, the device comprising:
a transceiver, configured to send configuration information to a first terminal device, wherein the configuration information is used to indicate a transmission resource available for each of M beam groups, each beam group comprises at least one beam of the at least two beams and M≥1, and a first transmission resource available for a first beam group of the M beam groups is used for physical downlink control channel (PDCCH) transmission,
wherein the transceiver is further configured to send first configuration information to the first terminal device, the first configuration information being used to indicate configurations of Q transmission resources and one-to-one mapping relationships between the Q transmission resources and Q first identifiers (IDs), wherein Q≥M and the Q transmission resources comprise the transmission resources available for the M beam groups; and
the transceiver is further configured to send second configuration information to the first terminal device, the second configuration information comprising the first ID corresponding to the transmission resource available for each of the M beam groups.

16. The device of claim 15, wherein the transceiver is configured to send the configuration information to the first terminal device through dedicated signaling for the first terminal device; or
the transceiver is configured to send the configuration information to a plurality of terminal devices comprising the first terminal device through a Physical Broadcast Channel (PBCH) or a system broadcast message.

17. The device of claim 15, wherein the configuration information is used to indicate one-to-one mapping relationships between the M beam groups and M transmission resources.

18. The device of claim 15, wherein the transmission resource comprises a time-domain transmission resource.

19. The device of claim 18, wherein a time-domain resource available for the communication system where the device is located is divided into at least two time units in a time domain, and
the configuration information is used to indicate a position of a time unit in the transmission resource available for each beam group in the at least two time units.

20. The device of claim 15, wherein the transmission resource comprises a frequency-domain transmission resource.

21. The device of claim 15, wherein the transmission resource available for each beam group comprises no transmission resource reserved by the communication system, and the transmission resource reserved by the communication system is only used to transmit a specified service or a specified channel.

22. A device for wireless communication, which is configured in a communication system using at least two beams, the device comprising:
a transceiver, configured to: receive configuration information sent by a network device, wherein the configuration information is used to indicate a transmission resource available for each of M beam groups, each beam group comprises at least one beam of the at least two beams and M≥1, and a first transmission resource available for a first beam group of the M beam groups is used for physical downlink control channel (PDCCH) transmission; and determine the first transmission resource for the PDCCH transmission according to the configuration information,
wherein the transceiver is further configured to receive first configuration information sent by the network device, the first configuration information being used to indicate configurations of Q transmission resources and one-to-one mapping relationships between the Q transmission resources and Q first identifier (IDs), wherein Q≥M and the Q transmission resources comprise transmission resources available for the M beam groups; and
the transceiver is further configured to receive second configuration information sent by the network device, the second configuration information comprising the first ID corresponding to the transmission resource available for each of the M beam groups.

23. The device of claim 22, wherein the transceiver is configured to receive the configuration information sent by the network device through dedicated signaling for the device; or the transceiver is configured to receive the configuration information sent to a plurality of terminal devices comprising the device by the network device through a Physical Broadcast Channel (PBCH) or a system broadcast message.

24. The device of claim 22, wherein the configuration information is used to indicate one-to-one mapping relationships between the M beam groups and M transmission resources.

25. The device of claim 22, wherein the transmission resource comprises a time-domain transmission resource.

26. The device of claim 25, wherein a time-domain resource available for the communication system where the network device is located is divided into at least two time units in a time domain, and the configuration information is used to indicate a position of a time unit in the transmission resource available for each beam group in the at least two time units.

27. The device of claim 22, wherein the transmission resource comprises a frequency-domain transmission resource.

28. The device of claim 22, wherein the transmission resource available for each beam group comprises no transmission resource reserved by the communication system, and the transmission resource reserved by the communication system is only used to transmit a specified service or a specified channel.

* * * * *